(12) United States Patent
Asman et al.

(10) Patent No.: US 10,609,109 B1
(45) Date of Patent: Mar. 31, 2020

(54) DELIVERY OF PERSONALIZED DIGITAL CONTENT IN REAL TIME

(71) Applicant: Pandora Media, Inc., Oakland, CA (US)

(72) Inventors: Andrew Asman, Park Hills, KY (US); Isaac Hill, Pleasanton, CA (US); Ruslan Yesikov, Pleasanton, CA (US)

(73) Assignee: Pandora Media, LLC, Oakland, CA (US)

( * ) Notice: Subject to any disclaimer, the term of this patent is extended or adjusted under 35 U.S.C. 154(b) by 98 days.

(21) Appl. No.: 15/921,509

(22) Filed: Mar. 14, 2018

Related U.S. Application Data

(60) Provisional application No. 62/501,702, filed on May 4, 2017.

(51) Int. Cl.
*H04L 29/06* (2006.01)
*G06F 16/435* (2019.01)
*G06F 16/22* (2019.01)

(52) U.S. Cl.
CPC .......... *H04L 65/80* (2013.01); *G06F 16/2282* (2019.01); *G06F 16/435* (2019.01); *H04L 65/1066* (2013.01); *H04L 65/60* (2013.01)

(58) Field of Classification Search
CPC ..................................................... H04L 65/80
See application file for complete search history.

(56) References Cited

U.S. PATENT DOCUMENTS

2004/0215718 A1* 10/2004 Kazmi ............... H04L 65/4084
709/203
2011/0010545 A1* 1/2011 Kill ......................... G06F 21/10
713/168

* cited by examiner

*Primary Examiner* — Adnan M Mirza
(74) *Attorney, Agent, or Firm* — Fenwick & West LLP

(57) ABSTRACT

A content mediating server receives from a client device a request for a next content item to be selected based on a content event relating to a current content item. The content mediating server generates requests for content from content providing servers providing content of corresponding types, and receives from each content providing server a content table relating content events in a set of content events to content items. For each content event in the set, the content mediating server selects, from the received tables, a content item, generates a composite content table relating each content event in the set to the selected content item, and transmits the composite table to the client device. The client device, in response to an observed content event relating to the current content item, selects the content item in the composite table corresponding to the observed content event as the next content item.

20 Claims, 6 Drawing Sheets

First Content Table 325a

| Track-End Event | Content to Present Next |
| --- | --- |
| Content Completed Successfully | C1, C2 |
| Content Skipped | C2 |
| Dislike | C3 |

FIG. 4A

Second Content Table 325b

| Track-End Event | Content to Present Next |
| --- | --- |
| Content Completed Successfully | C4 |
| Content Skipped | C4, C5 |
| Dislike | C6 |

FIG. 4B

Third Content Table 325c

| Track-End Event | Content to Present Next |
| --- | --- |
| Content Completed Successfully | C7, C8 |
| Content Skipped | C9 |
| Dislike | C9 |

FIG. 4C

Composite Content Table 335

| Track-End Event | Content to Present Next |
| --- | --- |
| Content Completed Successfully | C1, C2 |
| Content Skipped | C4, C6 |
| Dislike | C9 |

DELIVERY OF PERSONALIZED DIGITAL CONTENT IN REAL TIME

CROSS-REFERENCE TO RELATED APPLICATIONS

This application claims the benefit of U.S. Provisional Application No. 62/501,702, filed on May 4, 2017, which is hereby incorporated by reference in its entirety.

BACKGROUND

Field of Disclosure

The present invention generally relates to the delivery of content, and more specifically to mediating delivery of personalized digital content from multiple content providers in real time.

Description of the Related Art

Many users utilize their digital devices to consume digital content. For example, a user may use a media application on his or her digital device to play a stream of linear audio content (e.g., songs). Multiple types of audio content can be interspersed; for example, after every five songs played, the media application may play a message from an artist. Current media applications do not optimize among the types of content that can be played in real time. For example, current media applications do not respond to a user's reaction to the immediately prior content when determining which content to play, which can lead to a suboptimal user experience. For example, if a message from an artist is inserted after a song by the artist, and the user dislikes the song played before the message, the user may also be uninterested in hearing the message from that artist.

SUMMARY

The above and other issues are addressed by a method, computer-readable medium, and content mediating server for selecting content. A content mediator and a set of content providers coordinate to create a composite content table specifying content personalized to the user. Each content provider selects content of a corresponding content type (e.g., one content provider selects songs, another content provider selects artist messages, etc.), and the content mediator chooses among the content selected by the content providers to generate the composite content table. The content mediator transmits the composite content table to the user's client device. The client device uses the composite content table to select in real time a next linear content item or set of content items based on behavior of the user.

In an embodiment, a content mediating server receives a request for a next content item from a client device. The next content item is to be selected based at least in part on a content event of a set of content events relating to a current content item. In response to the request, the content mediating server generates a plurality of requests for content from a corresponding plurality of content providing servers providing content of a corresponding plurality of types. The content mediating server receives, from each of the content providing servers, a content table relating each content event in the set of content events to at least one content item of the corresponding type. For each content event in the set of content events, the content mediating server selects a content item corresponding to the content event from the received content tables. The content mediating server generates a composite content table relating each content event in the set of content events to the selected content item for the corresponding content event, and transmits the composite content table to the client device. The client device, in response to an observed content event relating to the current content item, selects the content item in the composite content table corresponding to the observed content event as the next content item.

BRIEF DESCRIPTION OF DRAWINGS

FIGS. 4A, 4B, and 4C show three exemplary content tables provided by content providers, according to one embodiment.

FIG. 4D shows an exemplary composite content table generated by a content mediator based on the content tables shown in FIGS. 4A-4C, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures.

Figure 1:
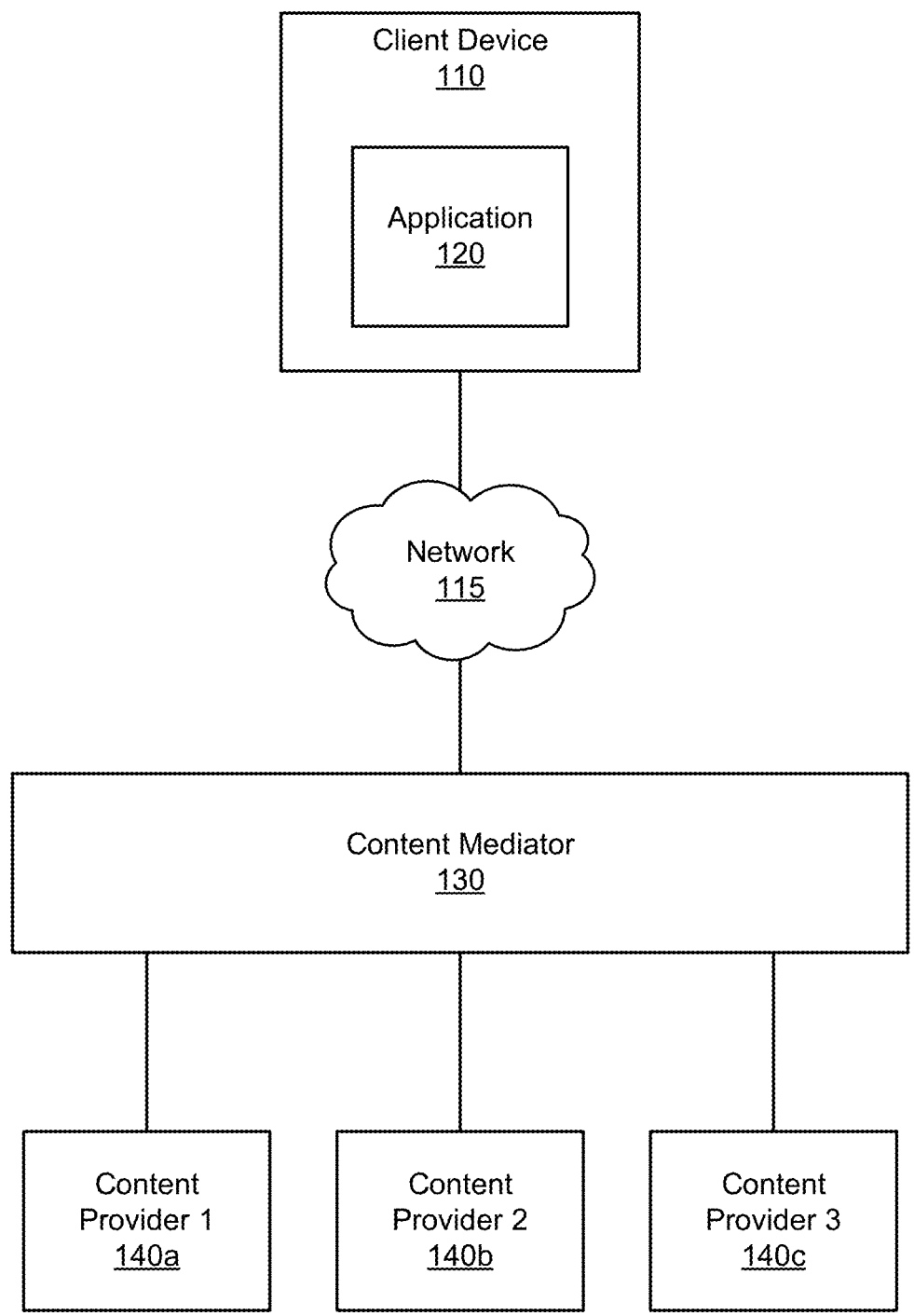
FIG. 1 is a high-level block diagram illustrating an embodiment of an environment for mediating delivery of personalized digital content from multiple content providers in real time.

FIG. 1 is a high-level block diagram illustrating an embodiment of an environment 100 for mediating delivery of personalized digital content from multiple content providers in real time. The environment 100 includes a client device 110 connected by a network 115 to a content mediator 130. The content mediator 130 is connected to three content providers 140. The content mediator 130 and content providers 140 may be part of a content service that provides content to the client device 110. Here, only one client device 110, one content mediator 130, and three content providers 140 are illustrated but there may be additional instances of each of these entities. For example, there may be thousands or millions of client devices 110 in communication with one or more content mediators 130.

It is noted that wherever practicable similar or like reference numbers may be used in the figures and may indicate similar or like functionality. A letter after a reference numeral, such as "140*a*," indicates that the text refers specifically to the element having that particular reference numeral. A reference numeral in the text without a following letter, such as "140," refers to any or all of the elements in the figures bearing that reference numeral. For example, "140" in the text refers to reference numerals "140a" and/or "140b" and/or "140c" in the figures.

The network 115 provides a communication infrastructure between the client devices 110 and the content mediator 130. The network is typically the Internet, but may be any network, including but not limited to a Local Area Network (LAN), a Metropolitan Area Network (MAN), a Wide Area Network (WAN), a mobile wired or wireless network, a private network, or a virtual private network. The same network or a different network provides a communication infrastructure between the content mediator 130 and the content providers 140. In some embodiments, one or more content providers 140 can also be directly connected to each other over a network. In some embodiments, the content mediator 130 and one or more of the content providers 140 are implemented as modules on a single server or server cluster.

The client devices 110 are computing devices such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. Typical client devices 110 include the hardware and software needed to input and output sound (e.g., speakers and microphone) and images, connect to a network (e.g., via Wifi and/or 4G or other wireless telecommunication standards), determine the current geographic location of the client devices 110 (e.g., a Global Positioning System (GPS) unit), detect and record a user's touch on the screen (e.g., capacitive or resistive touch sensors), and/or detect motion of the client devices 110 (e.g., via motion sensors such as accelerometers and gyroscopes).

The client device 110 includes an application 120 that allows interaction with the content mediator 130. For example, the application 120 could be a browser that allows a user of the client device 110 to obtain content by browsing a web site of the content service implemented by the content mediator 130 and content providers 140. As another example, the application 120 could be a dedicated application specifically designed (e.g., by the organization responsible for the content mediator 130 and/or content providers 140) to enable interactions with a content service using the content mediator 130. In some embodiments, the application 120 communicates with the content mediator 130 using API calls.

The application 120 presents content items responsive to a user selecting and/or creating a particular content channel. In one embodiment, the user uses the application 120 to send a seed for a content channel to the content service. The seed describes what type of content channel the user would like formed. The value of a seed may be, e.g., a name of a song, a name of a band, a name of genre of music, a combination of these items, etc. In some embodiments, the application 120 provides on-demand content channels curated by the content provider that can be selected by the user. For example, on-demand content channels can be related to a genre, time period, or mood. While a content item is presented on the current channel, the application 120 requests and receives from the content mediator 130 information describing a set of eligible content items to present next on the content channel. When the current content item or series of content items ends, the application 120 selects one or more of the eligible content items as the next content item(s) based on a content event, and presents the selected next content item(s) to the user. A content event is an action performed by the user or otherwise occurring on the client device 110 that is related to the current content item, such as a track end, a user thumbs up, a channel change, etc.

The application 120 also informs the content mediator 130 and/or content providers 140 of the content event. Each time a content item or set of content items is presented, the application 120 can request a new set of eligible content items from the content mediator 130. The client device 110 may retrieve the selected content from the content mediator 130, from the content provider 140 associated with the content, or from a separate streaming server. In some embodiments, the client device 110 pre-caches each eligible content item, or a portion of each eligible content item, so that the application 120 can present the selected content item without delay.

The content mediator 130 receives a request from a client device 110 for information describing a set of eligible content items to present next on a content channel. The content mediator 130 transmits requests for content to multiple content providers 140 and receives content, or data identifying content, from the content providers 140. For example, the content mediator 130 may receive from each content provider 140 a content table relating each content event to one or more content items. The content mediator 130 forms a composite content table based on the content tables received from the content providers 140. For example, the content mediator 130 chooses among the content included in the received content tables to generate a composite content table relating each content event to one or more content items included in one or more of the received content tables. In some embodiments, the content mediator 130 chooses at least one content item for each content event. The content mediator 130 personalizes the content it selects for the composite content table to the user of the client device 110. The content mediator 130 transmits the composite content table to the client device 110.

Each content provider 140 selects content for different content events. The selected content is personalized to the user of the client device 110 and, in some cases, to the current channel. In some embodiments, each content provider 140 provides content of a different type. For example, content provider 1 140a provides songs, content provider 2 140b provides artist messages, and content provider 3 140c provides sponsored messages. Additional content providers 140 may provide additional types of content. The content providers 140 transmit their selected content, or information identifying the selected content, to the content mediator 130, e.g., as a content table relating content items to content events. The content mediator 130 and content providers 140 can communicate using API calls.

Determining the optimal piece of content for multiple content events and among multiple different types of content with large libraries is computationally intensive. Separating the content mediator 130 from the content providers 140 splits up the content selection the into several smaller, more manageable tasks: first selecting content items for each content type at each of the individual content providers 140, and then selecting among the content items for each type provided by the content providers 140 at the content mediator 130. The content providers 140 operate in relative isolation with respect to the other content providers 140, so that each content provider 140 independently selects content for its specific content type.

In addition, providing a composite content table to the client device 110 while the client device 110 is presenting a current content item allows the client device 110 to provide a fast, personalized response to a content event. In particular, the composite content table allows the client device 110 to select the best content item based on the full context of the user's session. Further, receiving the composite content table while the client device 110 is presenting a current content item allows the client device 110 to pre-cache each of the options for the next content item.

In one particular embodiment referred to throughout the remainder of the specification, the content item is audio content, such as a song, piece of music, artist message, sponsored message, or other type of audio recording. It is appreciated, however, that in other embodiments a content item alternatively and/or additionally includes other forms of digital content, such as a video, movie, slideshow, or image. Thus, subsequent references to content items or other audio-related terminology could equally apply to (for example) viewing videos or otherwise experiencing media provided by the content service in other embodiments.

Figure 2B:
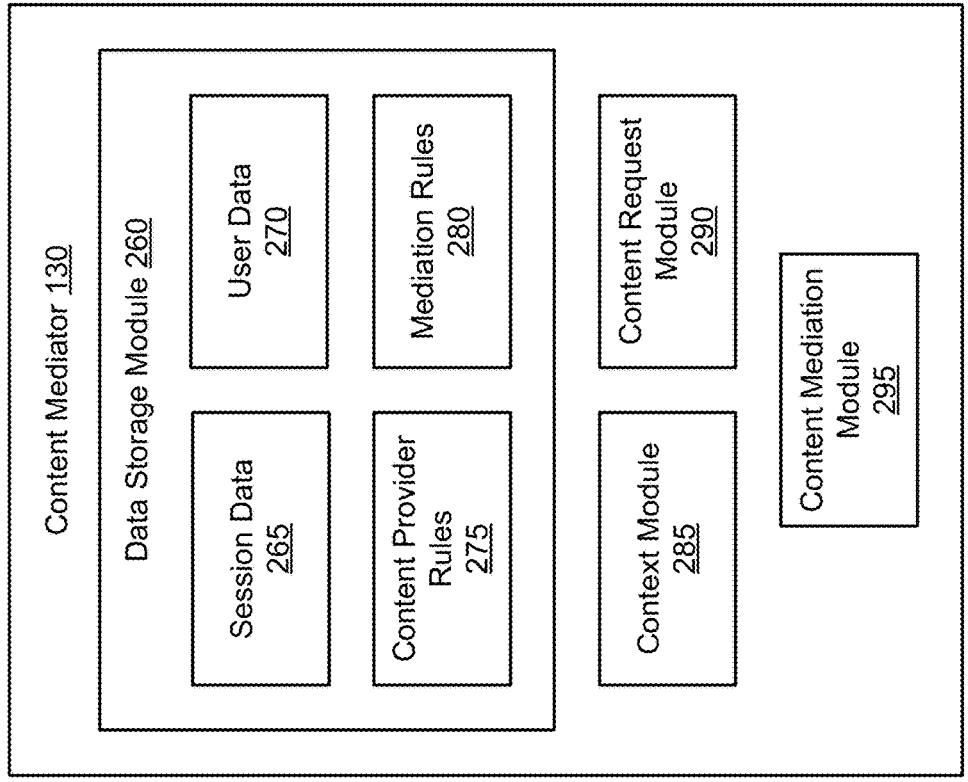
FIG. 2B is a block diagram illustrating a detailed view of a content mediator, according to one embodiment.
Figure 2A:
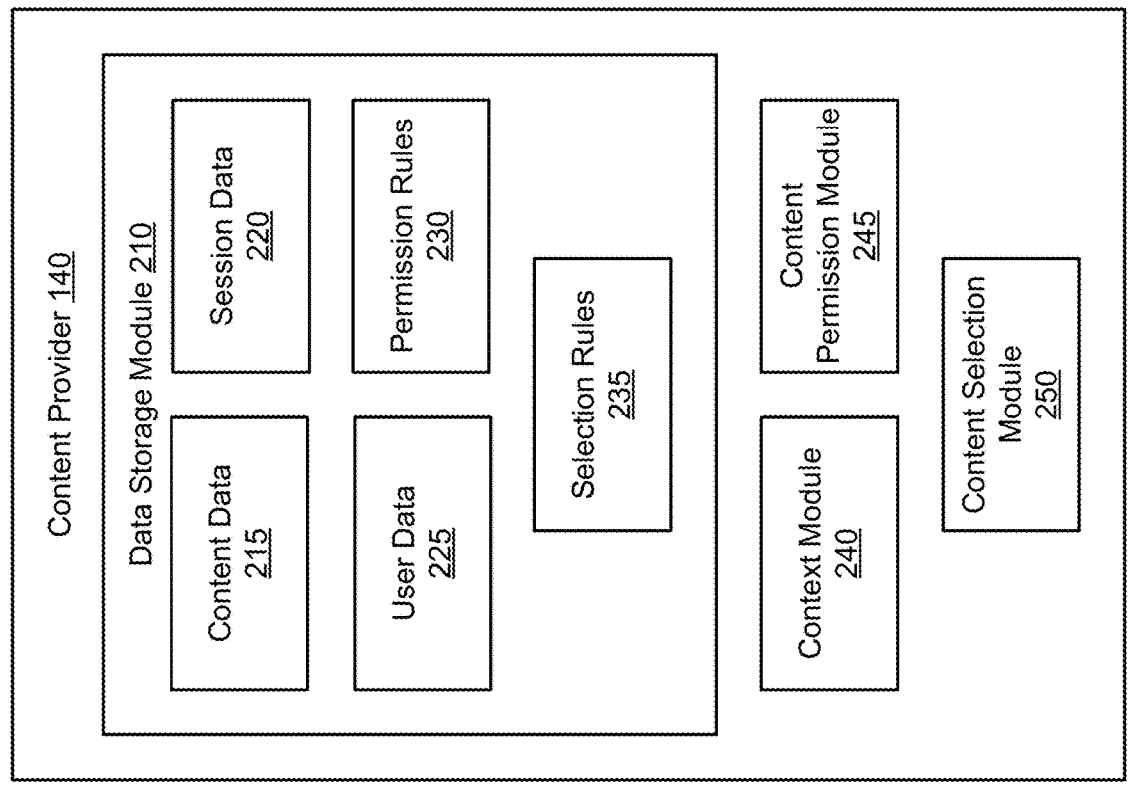
FIG. 2A is a block diagram illustrating a detailed view of a content provider, according to one embodiment.

FIG. 2A is a high-level block diagram illustrating a detailed view of a content provider 140, according to one embodiment. The content provider 140 may be implemented by one or more servers, e.g., a content providing server. The content provider 140 is comprised of modules including a data storage module 210, a context module 240, a content permission module 245, and a content selection module 250. Some embodiments of the content provider 140 have different modules than those described here. Similarly, the functions can be distributed among the modules in a different manner than is described here.

The data storage module 210 stores data used by the content provider 140. The data include content data 215, session data 220, user data 225, permission rules 230, and selection rules 235. The content data 215 describes a library of content items of the specific type (e.g., songs or messages) provided by the content provider 140. In some embodiments, the content provider 140 also stores the library of content items described by the content data 215, and serves content items to the client device 110, either directly or via the content mediator 130. In other embodiments, the content items are stored separately, and can be retrieved by the client device 110 or content mediator 130 from the separate storage.

The content data 215 include metadata for the content items. Metadata is data that describes a content item. For example, metadata for a song can include artist, song name, album name, length, etc. Metadata can also include musicological features that describe the musicological characteristics of the content items, e.g., the gender of the singer, the type of background vocals, the quality of the tones (e.g., pure or distorted), whether the melody dominates the composition, and an amount of gospel influence. A given content item may be described by many features, such as 100-500 features. In one embodiment, the mapping of content items to media features is established using the MUSIC GENOME PROJECT database created by PANDORA MEDIA, INC. of Oakland, Calif. The content data 215 can include other types of metadata, e.g., the provider of a content item, a value associated with the content item, one or more categories associated with the content item, etc.

The session data 220 includes data describing current streaming sessions of users of the content service, e.g., the user of the client device 110. A streaming session is a contiguous period of time during which the client device 110 plays music through the content service. For example, each time the client device 110 begins playing content using the application 120 may be considered the beginning of a new session. Alternatively, a session may begin when the user selects a channel, such that when a user switches from a first channel to a second channel, a new session begins. The session data 220 can include, for example, the content items played, the total time of the session, the length of time that each content item was played, the content event for each content item, and any feedback expressed for the content items. The session data 220 may be received from the content mediator 130 or from the client device 110.

The user data 225 includes data describing features and longer term listening habits of the users of the content service, e.g., the user of the client device 110. User data 225 can include demographic and/or psychographic features data, including age, gender, zip code, occupation, interests, activities, etc. User data 225 can also include the user's reactions to content items presented across multiple sessions. User data 225 can also include the user's overall listening habits, e.g., when the user consumes content, where the user consumes content, and which channels the user consumes at different times/locations. Some user data may be received from the content mediator 130. Some user data may be derived by the content provider 140, e.g., based on session data 220 obtained across multiple sessions. Other user data may be received from other modules of the content service, or from third parties. In some embodiments, different content providers 140 store different types of user data 225 based on the type of content provided. For example, a content provider that provides songs may store data relating to a user's musical interests, whereas a content provider that provides sponsored messages may store data relating to a user's purchasing habits, favorite stores, travel preferences, income level, etc. Some user data may describe a particular channel created or consumed by the user, whereas other user data may apply to multiple channels created or consumed by the user. Further, the data storage module 210 may store data that describes channels consumed by multiple users, e.g., data describing on-demand channels that are available to multiple users.

The permission rules 230 include rules used by the content provider 140 for determining whether the content provider 140 should select content in response to the request. Some permission rules can be conditions for whether the content provider 140 is enabled to return content; for example, the content provider 140 may be disabled in response to a system error at the content provider 140. Other permission rules can include conditions for whether the content provider 140 is enabled to return content for a particular user; for example, the content provider 140 may be disabled for a user if the user has opted out of the type of content provided by the content provider 140, in an A/B experiment in which only a portion of the users receive content, or in a staged rollout in which only a select set of the users receive content. In some embodiments, each of these rules is associated with a list of users. Other permission rules include conditions for the whether the content provider 140 is enabled to return content for a particular type of user; for example, the content provider 140 may be selectively disabled or enabled for registered users, subscribers, businesses, anonymous users, etc. Other permission rules can be conditions for whether the content provider 140 is enabled to return content based on the type of client device 110; for example, certain types of devices may be capable of receiving and displaying video content, while other devices cannot receive or display video content. In some embodiments, each of these rules is associated with a list of client devices 110 or client device properties. Other permission rules 230 may be conditions for controlling access of the content mediator 130 to the content provider

140. For example, one permission rule 230 can include one or more conditions for sending a delay for the content mediator 130 which the content mediator 130 waits before it is permitted to transmit another request for content to the content provider 140.

The selection rules 235 include rules for determining what content to return in response to the request, if the content provider 140 is enabled to return content (as determined using the permission rules 230). The selection rules 235 for selecting content can be specific to the type of content provided by the content provider 140, e.g., rules for selecting songs are different from rules for selecting sponsored messages. The selection rules 235 are used to select a content item for each of a plurality of content events related to the currently playing content. In some embodiments, a separate set of selection rules is included for each content event; in other embodiments, a single set of selection rules is used to select content for each content event. In general, selection rules 235 associate input data (as a few examples, current content item, previous content item, genre of current channel, age of user, or content event for which content is being selected) with content data 215 (e.g., content characteristics, or one or more specific content items described by the content data 215) so that particular content items described by the content data 215 can be selected based on the input data. The rules can be used to identify one or more content items that maximize the quality of the feedback returned by the user in response to the content. Multiple selection rules can be analyzed in concert to select a content item or set of content items.

In some embodiments, the selection rules 235 are in the form of a model that is trained to receive multiple data inputs about the user, channel, session, and/or content, and, based on the data inputs, determine one or more content items for each content event. For example, for a song content provider, the data inputs to the model can include the current content item and previously-played content items (e.g., received from the session data 220), feedback from the user about songs that were previously played on the current channel (e.g., from the session data 220 and/or user data 225), and metadata describing a set of available songs (e.g., from the content data 215). Based on these inputs, the model is used to identify one or more songs. For example, the model can directly output a selected song. Alternatively, the model can generate scores for multiple content items (e.g., content items within a particular category), and the content item with the highest score can be selected. In some embodiments, the model outputs data describing a set of characteristics (e.g., musicological features) that can be used to look up matching content using the content data 215 (e.g., the song that most closely matches the musicological features). The model can be trained using machine learning based on the user data 225 and past session data 220. The training of the model can identify the data inputs for the model and determine the rules for assessing the data inputs to select content.

The rules for selecting content can also include guarantees made to other parties (e.g., a content owner) by the content provider 140, such as a guarantee to play a particular sponsored message to a targeted user at least once every two listening hours, or a guarantee to play a particular song across all stations at least 10,000 times per day. In some embodiments, the model is a constrained optimization algorithm that attempts to optimize the quality of the feedback returned by the user in response to the selected content while maintaining a set of constraints, such as the guarantees made to content owners.

In different embodiments, the content provider 140 can use different content permission rules 245 or content selection rules 250 from the rules described above. In some embodiments, the content provider 140 does not use a rules-based or model-based approach to selecting content.

The context module 240 gathers and manages contextual information relevant to selecting content of the type provided by the content provider 140. The context module 240 can be configured based on the permission rules 230 and the selection rules 235 to retrieve the information that is used to apply the permission rules 230 and the selection rules 235. For example, the relevant contextual information can include information about the user's current session (e.g., the content item currently being presented by the application 120, the current channel, one or more prior content items presented on the channel, one or more prior content events), information about the client device 110 (e.g., supported file types), content previously selected by the content selection module 250, content selected by other content providers 140, and information about the user of the client device 110 (e.g., user identifier, whether the user is part of an experiment or rollout group, etc.). In some embodiments, the context module 240 first retrieves information used to apply the permission rules 230. Then, if the content provider 140 should select content according to the permission rules 230, the context module 240 retrieves additional information used to apply the selection rules 235.

In response to a request from the content mediator 130, the context module 240 can retrieve the relevant information from the data storage module 210. As an example, the data storage module 210 stores user data 225 associated with each user, including each channel associated with the user, and identifiers for each user and each channel. The request for content from the content mediator 130 includes an identifier for the user and an identifier for the channel. The context module 240 retrieves data describing the identified user and the identified channel from the user data 225. The context module 240 may also retrieve data describing the user's current session from the session data 220 based on the identifier of the user. In this example, the context module 240 can manage the storage of data in the data storage module 210, e.g., by periodically requesting session data and/or user data from the content mediator 130 and/or the user device 110 and storing the received data in the data storage module 210.

In some embodiments, the content provider 140 does not store session data 220 and/or user data 225, and instead the context module 240 receives relevant information about the current session, user, or channel from the content mediator 130 in the request for content. For example, the content provider 140 may receive a request from the content mediator 130 that includes information describing the current session, which may include information about the current content item and one or more previously played content items. The track information can include the content type, content identifier, length of time played (for previous content items), user feedback (for previous content items), etc. The request may also include information about the current channel, e.g., one or more genre descriptions and one or more artists associated with the channel.

The context module 240 can also receive additional data from one or more other content providers 140. For example, the song content provider and the artist message content provider receive parallel requests from the content mediator. Upon receiving the request from the content mediator 130, the artist content provider may transmit a request to the song content provider for the songs that the song content provider is returning to the content mediator 130 in response to the parallel request. In this case, the artist message content provider can select artist messages based on the songs that the song content provider is providing to the content mediator 130. For example, if the song content provider selects a song by Katy Perry for a content event, the artist message content provider can select an artist message from Katy Perry for the same content event.

The content permission module 245 applies the permission rules 230 to determine whether the content provider 140 should select content in response to the request. The content permission module 245 receives the relevant contextual information for the permission rules 230 from the context module 240, retrieves the permission rules 230, and then evaluates the permission rules 230 based on the contextual information relevant to each permission rule to determine whether any of the rules indicate that the content provider 140 should not select content for this request. For example, the content permission module 245 receives a user identifier from the context module 240, and based on a rule for determining if the content provider 140 is enabled for this user, checks a list of users who have opted out of the type of content provided by the content provider 140. If the user has opted out, the content permission module 245 does not select content for this request; if the user has not opted out, the content permission module 245 applies any remaining permission rules 230 to determine whether the content provider 140 should select content. The content permission module 245 may apply the rules sequentially or in parallel. In some embodiments, the content permission module 245 applies the rules in a particular order, e.g., by applying less computationally intensive permission rules first.

The content selection module 250 applies the selection rules 235 to select content that is personalized to the user and to the current session. The content selection module 250 receives the relevant contextual information for the selection rules 235 from the context module 240, retrieves the selection rules 235, and evaluates the selection rules 235 based on contextual information relevant to each selection rule to select content for each content event. For example, if the content selection rules 235 are structured as a model, the content selection module 250 applies the contextual information that model is configured to receive as inputs to the model. The content selection module 250 selects one or more content items for each of a plurality of content events. For example, the model applied by the content selection module 250 may output one content item for each content event. Each content selection module 250 selects content of the specific type provided by the content provider 140.

In some embodiments, the content selection module 250 may select a series of content items intended to be played sequentially. For example, if the content provider 140 is providing sponsored messages, the content selection module 250 may select two short messages to be played in sequence after a particular content event. In some embodiments, the content selection module 250 may select no content items for one or more content events. For example, if the model for selecting content outputs values for content items considered for selection for a content event, and no content item has a value above a given threshold, the content selection module 250 may select no content items for that content event. As another example, if the model for selecting content outputs features that are used to look up content in the content data 215, and no content data matches the features output for a content event, the content selection module 250 may select no content items for that content event. In some cases, the content selection module 250 may select the same content item for two or more content events.

The content selection module 250 may assemble a content table based on the selected content. A content table is a table associating each of a set of content events with the selected content item or items for the corresponding content event. The content provider 140 provides this content table to the content mediator 130 in response to the request. Examples of content tables are shown in FIG. 4A-4C.

FIG. 2B is a high-level block diagram illustrating a detailed view of a content mediator 130, according to one embodiment. The content mediator 130 may be implemented by one or more servers, e.g., a content mediating server. The content mediator 130 is comprised of modules including a data storage module 260, a context module 285, a content request module 290, and a content mediation module 295. Some embodiments of the content mediator 130 have different modules than those described here. Similarly, the functions can be distributed among the modules in a different manner than is described here.

The data storage module 260 stores data used by the content mediator 130. The data include session data 265, user data 270, content provider rules 275, and mediation rules 280. The content mediator 130 receives data from the application 120 about the current session, which the content mediator 130 stores as session data 265. The content mediator 130 may derive some user data 270 from session data 265 across multiple sessions, and receive additional user data (e.g., demographic data) directly from users via the application 120, from other content service modules, and/or from third parties. The session data 265 and user data 270 may include similar data to the session data 220 and user data 225 stored by the content provider 140. The user data 270 may store data of specific relevance to the content mediator 130, such as data describing the user's preferences for or reactions to different types of content, which may be learned by the content mediator 130 based on session data 265.

The content provider rules 275 include rules used by the content request module 290 to request content from the content providers 140. The content provider rules 275 can include rules describing which content providers 140 can provide content to which users, to which client devices 110, and on which channels. For example, certain premium users may not receive content from a sponsored content provider, or certain client devices 110 or applications 120 may not be capable of playing certain types of content. The content provider rules 275 can also include rules regarding delays for playing content types, or delays for transmitting requests for content to content providers 140. For example, as described above with respect to FIG. 2A, the content provider 140 can provide a delay time period after which the content mediator 130 is permitted to send another request; the content mediator 130 stores this delay information as a content provider rule 275. As another example, the content provider rules 275 may include a rule that a particular length of time must pass between consecutive sponsored messages or artist messages.

The mediation rules 280 include rules for selecting among the content returned by the content providers 140. The mediation rules 280 can include rules for selecting among the content returned by the content providers 140 based on one or more objectives, such as providing a good user experience, optimizing benefit to the content service, and avoiding ramifications of not selecting certain content. For example, the mediation rules 280 can balance trade-offs between user experience and other metrics, such as commitments made to content owners. Rules for predicting user experience can be developed on historical performance. For example, a machine-learned model can estimate the response from the user in response to a specific content item and/or type of content, based on the behavior of the user (both in the current session and longer term) and the current and recently played content items. This model can be used to assign a user experience value for each content item, which can be balanced against values assigned to the content items for one or more additional metrics. For example, the model can estimate the net benefit of each received content item to the user based on historical performance of content items.

The mediation rules 280 can include other types of rules, such as a mediation rule for joining like content provided by different content providers 140 for the same content event (e.g., an artist message and a song by the same artist) into a set of content to be played sequentially by the client device 110. As another example, the mediation rules 280 also include rules related to restrictions that the content mediator 130 enforces to avoid ramifications, e.g., from content owners. For example, one mediation rule could be a rule to play songs from a featured album a set number of times per day across all users. The mediation rules 280 may also include orders of precedence or other interactions between different rules. For example, a mediation rule can specify that like content is combined before being input to the model. Another mediation rule can specify that restrictions on certain content are used to weight the model outputs, or to override the selection indicated by the model.

In different embodiments, the content mediator 130 can use different content provider rules 275 or mediation rules 280 from the rules described above. In some embodiments, the content mediator 130 does not use a rules-based or model-based approach to selecting content.

The context module 285 manages contextual information relevant to selecting among the content items provided by the content providers 140. The context module 285 can be configured based on the content provider rules 275 and the mediation rules 280 to retrieve the information that is used to apply the content provider rules 275 and the mediation rules 280. For example, the relevant contextual information for applying the content provider rules 275 and the mediation rules 280 can include information about the user's current session, content previously selected by the content mediation module 295, content selected by content providers 140, and information about the user of the client device 110. The context module 285 retrieves the relevant data from the data storage module 260. In some embodiments, the context module 285 manages the storage of data in the data storage module 210, e.g., by storing data received from the client device 110 or third parties.

The content request module 290 implements the content provider rules 275 to identify from which content providers 140 to request content. The content request module 290 receives the relevant contextual information for the content provider rules 275 from the context module 285, retrieves the content provider rules 275, and evaluates the content provider rules 275 based on contextual information relevant to each content provider rule to select content providers 140. For example, the content request module 290 receives session data 265 that indicates the last time an artist message was played (e.g., 10 minutes ago) and rule that a particular length of time (e.g., 20 minutes) must pass between consecutive artist messages. The content request module 290 determines that the length of time between consecutive artist messages has not passed, so the content request module 290 does not request content from the artist message content provider 140. If the length of time between consecutive artist messages has passed (e.g., 25 minutes have elapsed since the last artist message), the content request module 290 applies any remaining content provider rules 275 to determine whether the content mediator 130 should request content from the artist message content provider 140. The content request module 290 may apply the rules sequentially or in parallel. In some embodiments, the content request module 290 applies the rules in a particular order, e.g., by applying less computationally intensive permission rules first. After the content request module 290 identifies the eligible content providers 140, the content mediator 130 requests content from the identified eligible content providers 140.

The content mediation module 295 selects among the content returned by the identified content providers 140 for each content event. The content mediation module 295 receives the relevant contextual information for the mediation rules 280 from the context module 285, retrieves the mediation rules 280, and receives the content tables provided by the content providers 140. The content mediation module 295 uses the mediation rules 280 to choose, for each content event, between the content provided by different content providers 140 for that content event based on contextual information relevant to each mediation rule. For example, if the mediation rules 280 are structured as a model, the content mediation module 295 applies the content tables and contextual information that model is configured to receive as inputs to the model. The model may output selected content items for each content event, or scores for the content items that the content mediation module 295 can use to select content items for each content event (e.g., by choosing the content item with the highest score, or choosing one or more content items above a threshold). The content mediation module 295 generates a composite content table associating each content event with information identifying the selected content item or items. The content mediator 140 sends this composite content table to the client device 110, which can retrieve the content items based on the identifying information.

For example, if three content providers 140 each return one content item (or information identifying one content item) for one content event, the content mediation module 295 selects one of these three content items for the content event, e.g., based on the content item for which the model outputs the highest score. In some embodiments, the content mediation module 295 may select a series of content items for a single content event to be played sequentially. For example, if a content provider 140 provides a set of content items to be played sequentially, the content mediation module 295 can analyze the set of content items collectively using the mediation rules 280, or may separately analyze each content item in the set and aggregate the results (e.g., by determining an average or maximum score). The content mediation module 295 can then compare the set of content items to the content items provided by other content providers 140 and select the set of content items, e.g., if they have the highest score. In some embodiments, the content mediation module 290 may create a set of content items to be played sequentially by combining two or more content items provided by different content providers 140, e.g., by selecting an message from one content provider followed by song from another content provider based on a mediation rule for joining like content.

In one embodiment, the content event used to select the next content item is related to an action on the current content item, such as an action or behavior that cause the content item to stop playing. For example, the user can allow the current content item to complete, so that the current content item stops playing at its end. Alternatively, the user request a content item to stop playing before the content item has completed playing, e.g., by disliking or skipping the current content item. Thus, one exemplary set of content events is completed successfully, disliked, and skipped. In some cases, a content item that the user disliked or requested to skip may still complete, e.g., if a user has skipped or disliked too many tracks in a given period of time. In some embodiments, the content events incorporate both feedback (e.g., like or dislike) and actual outcomes, e.g., completed-liked, completed-disliked, completed-no feedback, skipped-liked, skipped-disliked, and skipped-no feedback. In some embodiments, a default next content item may also be included in a set of content items. In other embodiments, the content associated with one of the content events, e.g., the completed event, may be used as the default next content item. The default next content item also can be used as the first content item played in a channel, and can be used if some event not included as a content event occurs.

Figure 3:
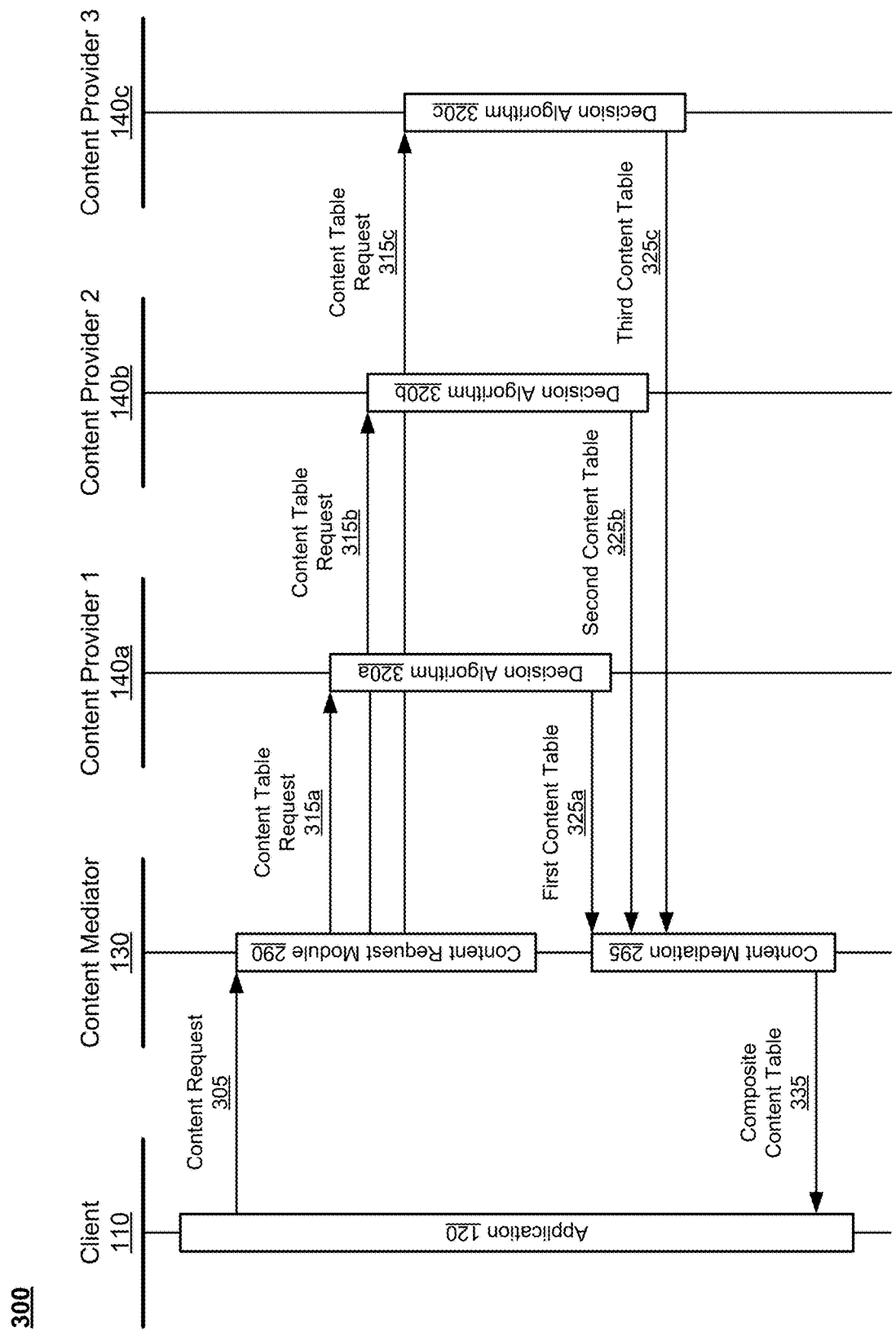
FIG. 3 is an interaction diagram illustrating a process of generating a composite content table used by a client device to select content, according to one embodiment.

FIG. 3 is an interaction diagram 300 illustrating a process of generating a composite content table used by a client device 110 to select content, according to one embodiment. The interaction diagram 300 shows the interaction between the client device 110, the content mediator 130, and three content providers 140a, 140b, and 140c.

The client device 110 is executing the application 120. The application 120 transmits a content request 305 to the content mediator 130 while the application 120 is presenting a current content item. In response to the content request 305, the content mediator 130 executes the content request module 290 to identify content providers 140 from which to request content. The content request module 290 identifies content provider 1 140a, content provider 2 140b, and content provider 3 140c as currently eligible for providing content. The content mediator 130 transmits content table requests 315a, 315b, and 315c to the three identified content providers 140a, 140b, and 140c, respectively.

Content provider 1 140a executes a decision algorithm 320a to select content items for each content event of the content type provided by content provider 1 140a. The decision algorithm 320a is implemented by the content selection module 250, as described with respect to FIG. 2A. Similarly, content provider 2 140b and content provider 3 140c each execute a respective decision algorithm 320b and 320c to select content items of the respective content types provided by the content providers 140b and 140c. Each decision algorithm 320a returns a respective content table 325 to the content mediator 130. Examples of the content tables 325 are shown in FIGS. 4A-4C.

In response to receiving the content tables 325, the content mediator 130 executes the content mediation module 295. The content mediation module 295 selects, for each of the content events, at least one content item from the received content tables 325 corresponding to the content event. The content mediation module 295 generates a composite content table 335 and transmits the composite content table 335 to the client device 110. An example of the composite content table 335 is shown in FIG. 4B.

The application 120 receives the composite content table 335 and may pre-cache the content items in the composite content table 335 while the current content item is still playing. When the application 120 observes one of the content events for the current content item, the application 120 selects the content item(s) in the composite content table 335 corresponding to the observed content event as the next content item, and begins presenting the next content item.

FIGS. 4A, 4B, and 4C show three exemplary content tables 325 provided by the content providers 140, according to one embodiment. FIG. 4A shows a first content table 325a that lists content provided by content provider 1 140a. FIG. 4B shows a second content table 325b that lists content provided by content provider 2 140b. FIG. 4C shows a third content table 325c that lists content provided by content provider 3 140c. Each content table 325 includes content of a different type, e.g., content C1 through C3 represent content of a first type (e.g., songs), content C4 through C6 represent content of a second type (e.g., artist messages), and content C7 through C9 represent content of a third type (e.g., sponsored messages). Each content table 325 includes content to present after each of three content events: content completed successfully, content skipped, and dislike. As shown in the content tables, the content to present next can include a series of multiple content items to be played sequentially, e.g., "C1, C2" in the first content table 325a. In addition, as shown in the third content table 325c, content provider 3 140c has selected the same content item C9 for both the condition where the content is skipped and the content is disliked.

The content tables 325 have a table data structure, in which event keys are the content events, and the values point to the content item or content items for the associated content event. To reduce the amount of data needed to store the content tables 325, the values may be content keys that point to content items. For example, the first content table 325a can have the following structure:

```
{
    "contentTable": {
        "COMPLETED": ["C1, C2"],
        "SKIP": ["C2"],
        "THUMB_DOWN": ["C3"]
    },
    "content": {
        "C1": {
            "trackToken": "abc",
            "trackType": "Track",
        "C2": {
            "trackToken": "def",
            "trackType": "Track",
        "C3": {
            "trackToken": "ghi",
            "trackType": "Track",
        }
    }
}
```

In the above content table, both a completed and a skip include the same track, C2. The content information for C2 is included only once by referring to the content items in the content table using content keys.

FIG. 4D shows an exemplary composite content table 335 generated by a content mediator based on the content tables shown in FIGS. 4A, 4B, and 4C, according to one embodiment. The composite content table 335 includes content to present after each of three content events: content completed successfully, content skipped, and dislike. The composite content table 335 shows that the content mediation module 295 selected the content from the first content table 325a for the content completed successfully event ("C1, C2"), the content from the second content table 325b for the content skipped event ("C4, C6"), and the content from the third content table 325c for the dislike event ("C9").

In some embodiments, composite content table 335 and, in some cases the content tables 325 may include an additional row for a channel change event. In some embodiments, the channel change event may not be associated with any content (e.g., the table includes a "null" value for the channel change event row). In this case, after a channel change event, the application 120 does not present any content based on the received table and instead transmits a new content request 305 to obtain a new composite content table for the new channel.

Figure 5:
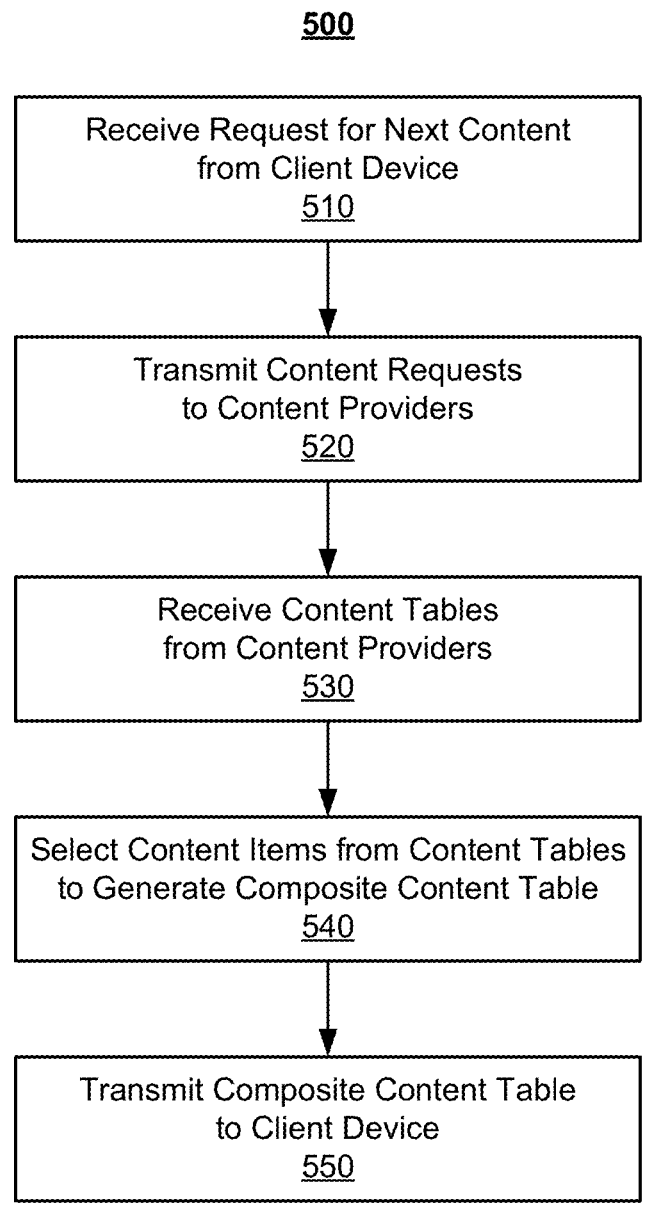
FIG. 5 is a flowchart illustrating a process of mediating delivery of personalized digital content from multiple content providers, according to an embodiment.

FIG. 5 is a flowchart illustrating a process of mediating delivery of personalized digital content from multiple content providers, according to an embodiment. The steps of FIG. 5 may be performed by the content mediator 130 as described below. Some or all of the steps may be performed by other modules in other embodiments. In addition, other embodiments may include different and/or additional steps and the steps may be performed in different orders.

The content mediator 130 receives 510 a request for next content from a client device. For example, the content mediator 130 may receive a request for next content from the client device 110 after the client device 110 begins playing a current content item.

The content mediator 130 transmits 520 a content request to content providers 140. For example, the content mediator 130 may identify multiple content providers 140 providing different types of content, and transmit content table requests 315 to the identified content providers 140.

The content mediator 130 receives 530 content tables from the content providers 140. For example, the content mediator 130 may receive the content tables 325a, 325b, and 325c shown in FIGS. 4A, 4B, and 4C from the identified content providers 140.

The content mediator 130 selects 540 content items from the content tables to generate a composite content table. For example, the content mediator 130 may select, for each content event, one or more content items from the content tables 325 to generate the composite content table 335, shown in FIG. 4D.

The content mediator transmits 550 the composite content table to the client device 110. The client device 110 may use this composite content table to pre-cache the content included in the composite content table, and to select a content item based on an observed content event for the current content item.

Figure 6:
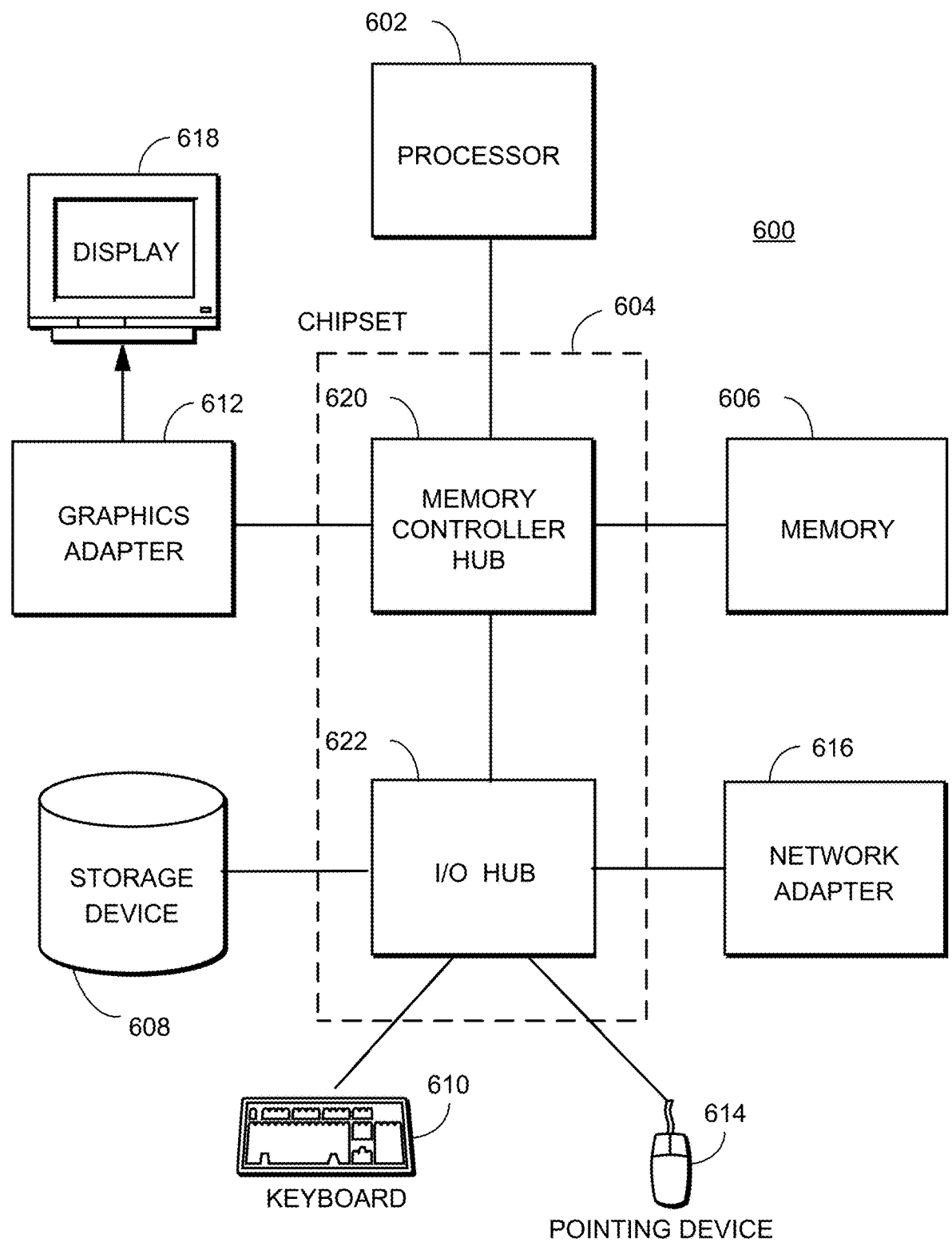
FIG. 6 is a high-level block diagram illustrating an example computer for implementing the client device, content provider, and/or the content mediator of FIG. 1.

FIG. 6 is a high-level block diagram illustrating an example computer 600 for implementing the client device, content provider, and/or the content mediator of FIG. 1. The computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, an input device 614, and network adapter 616 are coupled to the I/O controller hub 622. Other embodiments of the computer 600 have different architectures.

The storage device 608 is a non-transitory computer-readable storage medium such as a hard drive, compact disk read-only memory (CD-ROM), DVD, or a solid-state memory device. The memory 606 holds instructions and data used by the processor 602. The input interface 614 is a touch-screen interface, a mouse, track ball, or other type of pointing device, a keyboard, or some combination thereof, and is used to input data into the computer 600. In some embodiments, the computer 600 may be configured to receive input (e.g., commands) from the input interface 614 via gestures from the user. The graphics adapter 612 displays images and other information on the display 618. The network adapter 616 couples the computer 600 to one or more computer networks.

The computer 600 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 608, loaded into the memory 606, and executed by the processor 602.

The types of computers 600 used by the entities of FIG. 1 can vary depending upon the embodiment and the processing power required by the entity. The computers 600 can lack some of the components described above, such as graphics adapters 612, and displays 618. For example, the content mediator 130 and content providers 140 can each be formed of multiple blade servers communicating through a network such as in a server farm.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting content based on correlations between preferred media features and specific configurations of environmental information. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A method for selecting content comprising:
receiving, during a streaming session where media is streamed to a client device for playback, at a content mediating server from a client device, a request for a next content item to be played back at a conclusion of playback of a current content item at the client device during the streaming session, the next content item to be selected based at least in part on a content event relating to a current content item;
in response to the request, generating a plurality of requests for content from a corresponding plurality of content providing servers providing content of a corresponding plurality of types;
receiving a plurality of content tables from the plurality of content providing servers, wherein a content table relates content events in a set of content events to content items of the type provided by the corresponding content providing server;
for each content event in the set of content events, selecting, from the received plurality of content tables, at least one content item corresponding to the content event;
generating a composite content table relating each content event in the set of content events to the selected content item for the corresponding content event; and
transmitting the composite content table to the client device, wherein the client device, in response to an observed content event relating to the current content item, selects the content item in the composite content table corresponding to the observed content event as the next content item and plays back the content item following the conclusion of playback of the current content item.

2. The method of claim 1, wherein selecting the content item corresponding to the content event from the received content tables for one content event in the set of content events comprises:
retrieving session data describing content items played by the client device during a current session;
for content items in the received content tables corresponding to a particular content event, evaluating a set of mediation rules based on the session data, wherein the mediation rules estimate a response from the user in response to at least one of a particular content item and a type of content; and
selecting, based on the evaluation of the mediation rules, a content item in one of the received content tables corresponding to the particular content event, wherein the selected content item is included in the composite content table in association with the particular content event.

3. The method of claim 1, wherein generating the plurality of requests for content from the corresponding plurality of content providing servers comprises:
retrieving session data describing content items played by the client device during a current session;
evaluating a set of content provider rules based on the session data, wherein the set of content provider rules comprises a rule regarding a delay for playing consecutive content items from a particular content provider during a session; and
determining, based on the evaluation, to request content from the particular content provider for playing in the current session.

4. The method of claim 1, wherein generating the plurality of requests for content from the corresponding plurality of content providing servers comprises:
retrieving information describing at least one of a user of the client device, a type of the client device, and a current channel played by the client device;
evaluating a set of content provider rules based on the session data, wherein the set of content provider rules identify eligible content providers based on at least one of the user, the client device type, and the current channel; and
determining, based on the evaluation of the content provider rules, a set of eligible content providers from which to request content.

5. The method of claim 1, wherein one of the plurality of content providing servers generates a content table relating content events in the set of content events to content items of the type provided by the content providing server by:
retrieving session data describing content items played by the client device during a current session;
for each event of the set of events, evaluating a set of selection rules based on the session data, wherein the set of selection rules comprise a model for identifying content that maximizes feedback quality from a user of the client device based on the session data and the event of the set of events; and
generating, based on the evaluation of the content provider rules, the content table that associates each content event with the identified content for the content event.

6. The method of claim 1, wherein selecting the content item corresponding to the content event from the received content tables for one content event in the set of content events comprises selecting a series of content items, and the composite content table relates the one content event in the set of content events to the series of content items.

7. The method of claim 1, wherein the composite content table further comprises at least one additional content event that is not related to a content item.

8. A non-transitory computer-readable storage medium storing computer program instructions executable by a processor to perform operations comprising:
receiving, from a client device, during a streaming session where media is streamed to a client device for playback, a request for a next content item to be played back at a conclusion of playback of a current content item at the client device during the streaming session, the next content item to be selected based at least in part on a content event relating to a current content item;

in response to the request, generating a plurality of requests for content from a corresponding plurality of content providing servers providing content of a corresponding plurality of types;

receiving a plurality of content tables from the plurality of content providing servers, wherein a content table relates content events in a set of content events to content items of the type provided by the corresponding content providing server;

for each content event in the set of content events, selecting, from the received plurality of content tables, at least one content item corresponding to the content event;

generating a composite content table relating each content event in the set of content events to the selected content item for the corresponding content event; and transmitting the composite content table to the client device, wherein the client device, in response to an observed content event relating to the current content item, selects the content item in the composite content table corresponding to the observed content event as the next content item and plays back the content item following the conclusion of playback of the current content item.

9. The computer-readable storage medium of claim 8, wherein selecting the content item corresponding to the content event from the received content tables for one content event in the set of content events comprises:

retrieving session data describing content items played by the client device during a current session;

for content items in the received content tables corresponding to a particular content event, evaluating a set of mediation rules based on the session data, wherein the mediation rules estimate a response from the user in response to at least one of a particular content item and a type of content; and selecting, based on the evaluation of the mediation rules, a content item in one of the received content tables corresponding to the particular content event, wherein the selected content item is included in the composite content table in association with the particular content event.

10. The computer-readable storage medium of claim 8, wherein generating the plurality of requests for content from the corresponding plurality of content providing servers comprises:

retrieving session data describing content items played by the client device during a current session;

evaluating a set of content provider rules based on the session data, wherein the set of content provider rules comprises a rule regarding a delay for playing consecutive content items from a particular content provider during a session; and determining, based on the evaluation, to request content from the particular content provider for playing in the current session.

11. The computer-readable storage medium of claim 8, wherein generating the plurality of requests for content from the corresponding plurality of content providing servers comprises:

retrieving information describing at least one of a user of the client device, a type of the client device, and a current channel played by the client device;

evaluating a set of content provider rules based on the session data, wherein the set of content provider rules identify eligible content providers based on at least one of the user, the client device type, and the current channel; and determining, based on the evaluation of the content provider rules, a set of eligible content providers from which to request content.

12. The computer-readable storage medium of claim 8, wherein one of the plurality of content providing servers generates a content table relating content events in the set of content events to content items of the type provided by the content providing server by:

retrieving session data describing content items played by the client device during a current session;

for each event of the set of events, evaluating a set of selection rules based on the session data, wherein the set of selection rules comprise a model for identifying content that maximizes feedback quality from a user of the client device based on the session data and the event of the set of events; and generating, based on the evaluation of the content provider rules, the content table that associates each content event with the identified content for the content event.

13. The computer-readable storage medium of claim 8, wherein selecting the content item corresponding to the content event from the received content tables for one content event in the set of content events comprises selecting a series of content items, and the composite content table relates the one content event in the set of content events to the series of content items.

14. The computer-readable storage medium of claim 8, wherein the composite content table further comprises at least one additional content event that is not related to a content item.

15. A system comprising a computer processor for executing computer program instructions, and a non-transitory computer-readable storage medium storing computer program instructions executable by the processor to perform operations comprising:

receiving, from a client device, during a streaming session where media is streamed to a client device for playback, a request for a next content item to be played back at a conclusion of playback of a current content item at the client device during the streaming session, the next content item to be selected based at least in part on a content event relating to a current content item;

in response to the request, generating a plurality of requests for content from a corresponding plurality of content providing servers providing content of a corresponding plurality of types;

receiving a plurality of content tables from the plurality of content providing servers, wherein a content table relates content events in a set of content events to content items of the type provided by the corresponding content providing server;

for each content event in the set of content events, selecting, from the received plurality of content tables, at least one content item corresponding to the content event;

generating a composite content table relating each content event in the set of content events to the selected content item for the corresponding content event; and transmitting the composite content table to the client device, wherein the client device, in response to an observed content event relating to the current content item, selects the content item in the composite content table corresponding to the observed content event as the next content item and plays back the content item following the conclusion of playback of the current content item.

16. The system of claim 15, wherein selecting the content item corresponding to the content event from the received content tables for one content event in the set of content events comprises:
  retrieving session data describing content items played by the client device during a current session;
  for content items in the received content tables corresponding to a particular content event, evaluating a set of mediation rules based on the session data, wherein the mediation rules estimate a response from the user in response to at least one of a particular content item and a type of content; and
  selecting, based on the evaluation of the mediation rules, a content item in one of the received content tables corresponding to the particular content event, wherein the selected content item is included in the composite content table in association with the particular content event.

17. The system of claim 15, wherein generating the plurality of requests for content from the corresponding plurality of content providing servers comprises:
  retrieving session data describing content items played by the client device during a current session;
  evaluating a set of content provider rules based on the session data, wherein the set of content provider rules comprises a rule regarding a delay for playing consecutive content items from a particular content provider during a session; and
  determining, based on the evaluation, to request content from the particular content provider for playing in the current session.

18. The system of claim 15, wherein generating the plurality of requests for content from the corresponding plurality of content providing servers comprises:
  retrieving information describing at least one of a user of the client device, a type of the client device, and a current channel played by the client device;
  evaluating a set of content provider rules based on the session data, wherein the set of content provider rules identify eligible content providers based on at least one of the user, the client device type, and the current channel; and
  determining, based on the evaluation of the content provider rules, a set of eligible content providers from which to request content.

19. The system of claim 15, wherein one of the plurality of content providing servers generates a content table relating content events in the set of content events to content items of the type provided by the content providing server by:
  retrieving session data describing content items played by the client device during a current session;
  for each event of the set of events, evaluating a set of selection rules based on the session data, wherein the set of selection rules comprise a model for identifying content that maximizes feedback quality from a user of the client device based on the session data and the event of the set of events; and
  generating, based on the evaluation of the content provider rules, the content table that associates each content event with the identified content for the content event.

20. The system of claim 15, wherein selecting the content item corresponding to the content event from the received content tables for one content event in the set of content events comprises selecting a series of content items, and the composite content table relates the one content event in the set of content events to the series of content items.

* * * * *